US012143354B1

(12) United States Patent
Martin et al.

(10) Patent No.: US 12,143,354 B1
(45) Date of Patent: Nov. 12, 2024

(54) FWA GATEWAY NETWORK ADDRESS TRANSLATION BASED ON NETWORK SLICING TRAFFIC CLASSIFICATION

(71) Applicant: Verizon Patent and Licensing Inc., Basking Ridge, NJ (US)

(72) Inventors: Christopher M. Martin, Walpole, MA (US); Lily Zhu, Parsippany, NJ (US); Christopher Francis Mooney, Bridgewater, NJ (US); Samirkumar Patel, Middlesex, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/314,483

(22) Filed: May 9, 2023

(51) Int. Cl.
*H04L 61/256* (2022.01)
*H04L 9/40* (2022.01)
*H04L 67/1008* (2022.01)
*H04L 12/46* (2006.01)
*H04L 45/00* (2022.01)
*H04W 88/16* (2009.01)

(52) U.S. Cl.
CPC .......... *H04L 61/256* (2013.01); *H04L 63/20* (2013.01); *H04L 67/1008* (2013.01); *H04L 12/4633* (2013.01); *H04L 45/38* (2013.01); *H04W 88/16* (2013.01)

(58) Field of Classification Search
CPC ..... H04L 63/20; H04L 45/38; H04L 12/4633; H04L 67/1008
See application file for complete search history.

(56) References Cited

U.S. PATENT DOCUMENTS

| | | | |
|---|---|---|---|
| 2013/0132531 A1* | 5/2013 | Koponen | H04L 67/1008 709/220 |
| 2023/0179638 A1* | 6/2023 | Hu | H04L 63/20 726/1 |
| 2023/0412526 A1* | 12/2023 | Nallamothu | H04L 12/4633 |
| 2024/0031908 A1* | 1/2024 | Grewal | H04L 45/38 |

* cited by examiner

*Primary Examiner* — Barbara B Anyan

(57) ABSTRACT

A gateway wirelessly connected to a mobile network receives traffic for a user equipment device (UE) connected to the gateway. A router of the gateway identifies a network slice, from a set of network slices potentially supported by the mobile network, for the traffic, and applies network address translation (NAT) policy rules to select a NAT type from multiple different NAT types to perform for the traffic based on the identified network slice. The router of the gateway performs the selected NAT type for the traffic and forwards the traffic to a gateway modem for transmitting towards the traffic's destination.

20 Claims, 13 Drawing Sheets

FWA GATEWAY NETWORK ADDRESS TRANSLATION BASED ON NETWORK SLICING TRAFFIC CLASSIFICATION

BACKGROUND

Next Generation mobile networks, such as, for example, Fifth Generation New Radio (5G NR) mobile networks, may operate in high frequency ranges (e.g., in the gigahertz (GHz) frequency band), and may have a broad bandwidth (e.g., near 500-1,000 megahertz (MHz)). The bandwidth of Next Generation mobile networks supports high speed uploads and downloads. The 5G mobile telecommunications standard supports more reliable, massive machine communications (e.g., machine-to-machine (M2M), Internet of Things (IoT)). Next Generation mobile networks, such as those implementing the 5G mobile telecommunications standard, are expected to enable a higher utilization capacity than current wireless networks, permitting a greater density of wireless users. Next Generation mobile networks are designed to increase data transfer rates, increase spectral efficiency, improve coverage, improve capacity, and reduce latency.

"Network Slicing" is an innovation in mobile networks such as, for example, Next Generation Mobile Networks. More specifically, network slicing is a type of virtualized networking architecture that involves partitioning a single physical network into multiple virtual networks. The partitions, or "slices," of a virtualized network may be customized to meet the specific needs of applications, services, devices, customers, or operators. Each network slice can have its own architecture, provisioning management, and security features that supports a particular application or service. Bandwidth, capacity, and connectivity functions are allocated within each network slice to meet the requirements of the particular network slice. Network slicing may be implemented in a dynamic fashion, such that the slices of the virtualized network may change over time and may be re-customized to meet new or changing needs of applications, services, devices, customers, or operators.

DETAILED DESCRIPTION OF THE PREFERRED EMBODIMENTS

Figure 1:
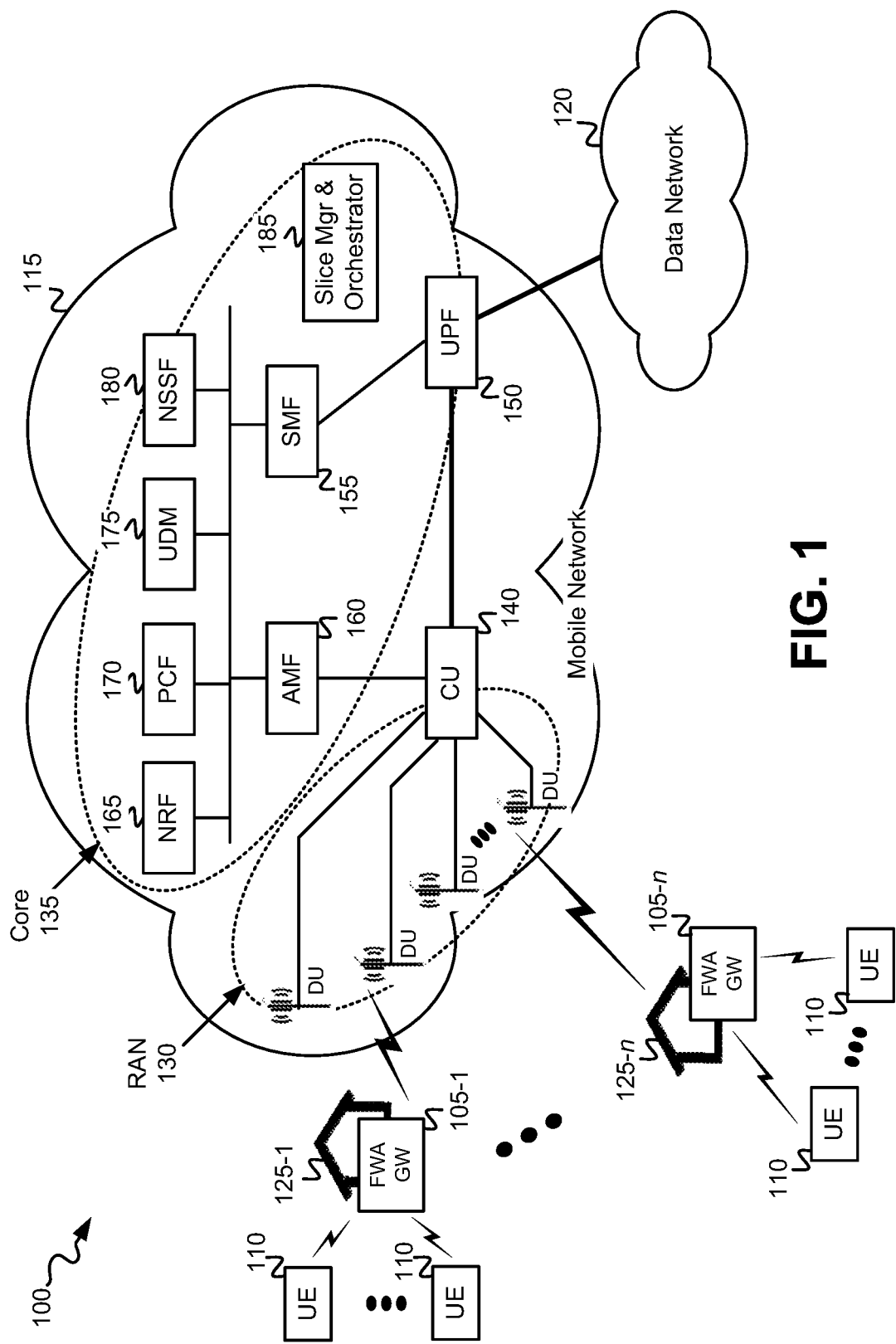
FIG. 1 illustrates an exemplary network environment in which network address translation is performed at Fixed Wireless Access (FWA) gateways based on network slicing traffic classifications.

The following detailed description refers to the accompanying drawings. The same reference numbers in different drawings may identify the same or similar elements. The following detailed description does not limit the invention.

Fixed Wireless Access (FWA) is a type of network service that may be implemented by Next Generation mobile networks (e.g., 5G NR mobile networks) to enable network operators to deliver ultra-high-speed wireless broadband to suburban and rural areas without laying optical fiber or cables to provide "last mile" connectivity. The cost of providing fixed, wired broadband has challenged the roll-out of high-speed data services in many geographic areas. While different technologies, such as, for example, Worldwide Interoperability for Microwave Access (WiMAX), have attempted to alleviate the need to lay optical fiber trenches, these technologies have largely failed in the marketplace, primarily due to these technologies' requiring a completely new infrastructure and expensive proprietary equipment. FWA, in contrast, employs standardized mobile network architectures and common mobile network components to deliver ultra-high-speed broadband services to residential and business subscribers. FWA implemented by Next Generation mobile networks, or by other types of mobile networks (e.g., Fourth Generation (4G) Long-Term evolution (LTE) networks), provides a competitive alternative to fixed-line Digital Subscriber Line (DSL), cable, and optical fiber, while also providing the bandwidth required to support high-definition streaming services and high-speed Internet access.

In a mobile network that implements FWA, residential or business locations may use a FWA gateway (e.g., a 5G Residential Gateway (RG)) to provide a connection between the network equipment (e.g., within a home or business) and the mobile core network. The FWA gateway operates as a gateway between the mobile network and a downstream Local Area Network (LAN), to which the residential or business located user equipment devices (UEs) connect. Use of the FWA gateway, however, creates difficulties with extending network slicing from the mobile network out to the FWA gateway, while also performing network address translation (NAT) for incoming and outgoing traffic at the FWA gateway.

In example embodiments described herein, a FWA gateway (e.g., a 5G RG) performs network slicing-based traffic classification and then uses results of the traffic classification to select and perform different types of NAT for incoming and outgoing traffic at the FWA gateway. For downstream traffic, the classification may be based on the particular network slice to which each classified traffic is directed. For upstream traffic, the classification may additionally, or alternatively, be based on various characteristics associated with the traffic including Internet Protocol (IP) addresses, ports, Differentiated Services Code Point (DSCP) markings, protocol type, and/or packet lengths. The FWA gateway described herein enables end-to-end network slices to be implemented between a mobile network and the FWA gateway, which may be located at a residential or business location, and performs network slicing-based NAT.

FIG. 1 illustrates an exemplary network environment 100 in which NAT is performed at FWA gateways based on network slicing-based traffic classifications. As shown, network environment 100 may include multiple FWA gateways (GWs) 105-1 through 105-n (referred to herein as "FWA GW 105" or "FWA GWs 105"), multiple user equipment devices (UEs) 110, a mobile network 115, and a data network(s) 120.

Each FWA GW 105 includes a network device that serves as a gateway between mobile network 115 and UEs 110 connected on a LAN-side of each FWA GW 105. The FWA GW 105 supports a wireless interface (e.g., Uu interface for 5G RG devices) for sending/receiving Radio Frequency (RF) signals to/from a Radio Access Network (RAN) of mobile network 115 on a WAN side of the FWA GW 105. FWA GW 105 additionally supports a wireless and/or wired interface for the UEs to communicate with FWA GW 105 on the LAN side of FWA GW 105. The wireless interface may support, for example, wireless LAN access (e.g., Wi-Fi) and/or wireless personal area network (PAN) access (e.g., Bluetooth) to UEs 110. The wired interface may support, for example, wired LAN access to UEs 110. FWA GW 105 enables UEs 110 to engage in traffic sessions (e.g., Protocol Data Unit (PDU) sessions) with mobile network 115 and/or data network 120 via RF signals sent to/received from the RAN of mobile network 115. As shown in FIG. 1, each FWA GW 105 may be located at a particular residence or business location 125. For example, FWA GW 105-1 is shown located at residence/business location 125-1, FWA GW 105-2 is shown located at residence/business location 125-2, and FWA GW 105-n is shown located at residence/business location 125-n.

Each of the UEs 105 may include any type of device having a communication capability such as, for example, a wired and/or wireless communication capability that enables the establishment of a connection with a respective FWA GW 105. UEs 105 may include, for example, a laptop, palmtop, wearable, or tablet computer; a cellular phone (e.g., a "smart" phone); a Voice over Internet Protocol (VOIP) phone; an audio speaker (e.g., a "smart" speaker); a video gaming device; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user (not shown) may carry, use, administer, and/or operate each UE 105. Each UE 105 may communicate wirelessly with FWA GW 155 via, for example, a wireless LAN (e.g., Wi-Fi) or a wireless PAN (e.g., Bluetooth). Alternatively, or additionally, each UE 105 may communicate via a wired connection with FWA GW 105 (e.g., via a wired LAN). Each UE 105 may include any type of networked device that connects to FWA GW 105, and to mobile network 115 via a connection between FWA GW 105 and RAN 130 of mobile network 115.

Mobile network 115 (also referred to herein as "mobile network 115," "wireless network 115," or "network 115") may include a Public Land Mobile Network (PLMN) and possibly one or more other networks (not shown) that provides wireless (e.g., RF) communication with FWA GWs 105, and other UEs not shown in FIG. 1. Mobile network 115 may include sub-networks, such as a RAN 130 and a core network 135. RAN 130 may include various types of radio access equipment that enable RF communication with FWA GWs 105, and other UEs not shown in FIG. 1. The radio access equipment of RAN 130 may include, for example, multiple Distributed Units (DUs), and at least one Centralized Unit (CU) 140. Each CU 140 includes a network device that operates as a digital function unit that transmits digital baseband signals to the multiple DUs, and receives digital baseband signals from the multiple DUs. The DUs may include network devices that operate as radio function units that transmit and receive RF signals to/from UEs 105 and which are located at fixed geographic positions within mobile network 115. CU 140 may interconnect with the DUs of RAN 130 via fronthaul links or a fronthaul network. Each of the DUs may include at least one antenna array, transceiver circuitry, and other hardware and software components for enabling the DUs to receive data via wireless RF signals from FWA GWs 105 (and other UEs not shown), and to transmit wireless RF signals to FWA GWs 105 (and other UEs not shown).

In implementations in which mobile network 110 is a 5G NR network (such as shown in FIG. 1), a CU 140 and one or more DUs may represent a distributed Next Generation NodeB (gNB), which may also be referred to herein as a "base station." The CU 140 and DUs may also represent a distributed Long-Term Evolution (LTE) evolved NodeB (eNB) (e.g., an enhanced LTE (eLTE) eNB), also referred to herein as a "base station," that can connect to mobile network 115. Though only a single CU 140 and several DUs are shown in FIG. 1, RAN 130 may include multiple CUs 140 and any number of DUs. Each CU 140 may connect to a respective set of DUs. RAN 130 may additionally include other nodes, functions, and/or components not shown in FIG. 1.

Core network 135 includes devices or nodes that host and execute network functions (NFs) that operate the mobile network 115 including, among other NFs, mobile network access management, session management, and policy control NFs. In the exemplary network environment 100 of FIG. 1, core network 135 is shown as including a 5G mobile network that further includes 5G Network Functions (NFs), such as a User Plane Function (UPF) 150, a Session Management Function (SMF) 155, an Access and Mobility Management Function (AMF) 160, a Network Repository Function (NRF) 165, a Policy Control Function (PCF) 170, a Unified Data Management (UDM) function 175, and a Network Slice Selection Function (NSSF) 180. UPF 150, SMF 155, AMF 160, NRF 165, PCF 170, UDM 175, and NSSF 180 may be implemented as virtual network functions (VNFs) (e.g., at a data center(s)) within mobile network 115. Core network 135 is further shown as including a slice manager and orchestrator 185.

UPF 150 may act as a router and a gateway between mobile network 115 and data network 120, and forwards session data between data network 120 and RAN 130. Though only a single UPF 150 is shown in FIG. 1, mobile network 110 may include multiple UPFs 150 at various locations in network 115. SMF 155 performs session management, allocates network addresses to FWA GWs 105 and/or UEs 105 connected on a LAN side of FWA GWs 105, and selects and controls UPFs 150 for data transfer. AMF 160 performs authentication, authorization, and mobility management for FWA GWs 105 and UEs 105.

NRF 165 operates as a centralized repository of information regarding NFs in mobile network 115. NRF 165 enables NFs (e.g., UPF 150, SMF 155, AMF 160, UDM 175, PCF 170, UDM 175) to register and discover each other via an Application Programming interface (API). NRF 165 maintains an updated repository of information about the NFs available in mobile network 115, along with information about the services provided by each of the NFs. NRF 165 further enables the NFs to obtain updated status information of other NFs in mobile network 115. NRF 165 may, for example, maintain profiles of available NF instances and their supported services, allow NF instances to discover other NF instances in mobile network 115, and allow NF instances to track the status of other NF instances.

PCF 170 may provide policy rules for control plane functions (e.g., for network slicing, roaming, and/or mobility management) and may access user subscription information for policy decisions. UDM 175 manages data for user access authorization, user registration, and data network profiles. UDM 175 may include, or operate in conjunction with, a User Data Repository (UDR—not shown) which stores user data, such as customer profile information, customer authentication information, user-subscribed network slice information, and encryption keys. NSSF 180 selects a set of network slice instances that may serve a UE session, and determines the allowed single Network Slice Selection Assistance Information (S-NSSAI) for the UE session. Slice Manager & Orchestrator 185, described in further detail below, performs, among other operations and functions, network slice and network slice instance (NSI) creation, virtual network resource allocation, instantiation, and provisioning, and network slice and NSI monitoring, reporting, and life cycle management (LCM).

Data network 120 may include one or more interconnected networks, such as local area networks (LANs), wide area networks (WANs), metropolitan area networks (MANs), and/or the Internet that are external to, and connected to, mobile network 115. Data network 120 may connect with UPF(s) 150 of mobile network 115. Data network 120 may further connect to one or more network devices (e.g., a server) that execute at least one application, and/or which provide server functions or network services.

The configuration of network components of the example network environment 100 of FIG. 1 is for illustrative purposes. Other configurations may be implemented. Therefore, network environment 100 may include additional, fewer, and/or different components that may be configured in a different arrangement than that depicted in FIG. 1. For example, core network 135 may include other NFs not shown in FIG. 1. As a further example, though mobile network 115 is depicted in FIG. 1 as a 5G network having 5G network components/functions, mobile network 115 may alternatively include a 4G or 4.5G network with corresponding network components/functions, or a hybrid 5G/4G network that includes certain components of both a Next Generation network (e.g., a 5G network) and a 4G Long Term Evolution (LTE) network. Mobile network 114 may alternatively include another type of Next Generation network, other than the 5G network shown in FIG. 1 (e.g., a Sixth Generation (6G) mobile network). Additionally, though only a single instance of each of the NFs (e.g., UPF 150, SMF 155, AMF 160, NRF 165, PCF 170, UDM 175) is shown in FIG. 1, mobile network 115 may include multiple instances of each of the NFs. For example, when mobile network 115 implements network slicing, each of the configured network slices may include its own SMF 155, PCF 170, and UPF 150. Each of the NFs described above may be installed in, and be executed by, a network device residing in mobile network 115, or in another network (e.g., in an edge or a far edge network, not shown). A single network device may host and execute one or more of the NFs described above, and mobile network 115 may include at least one network device, or may have multiple (e.g., numerous) network devices.

Figure 2:
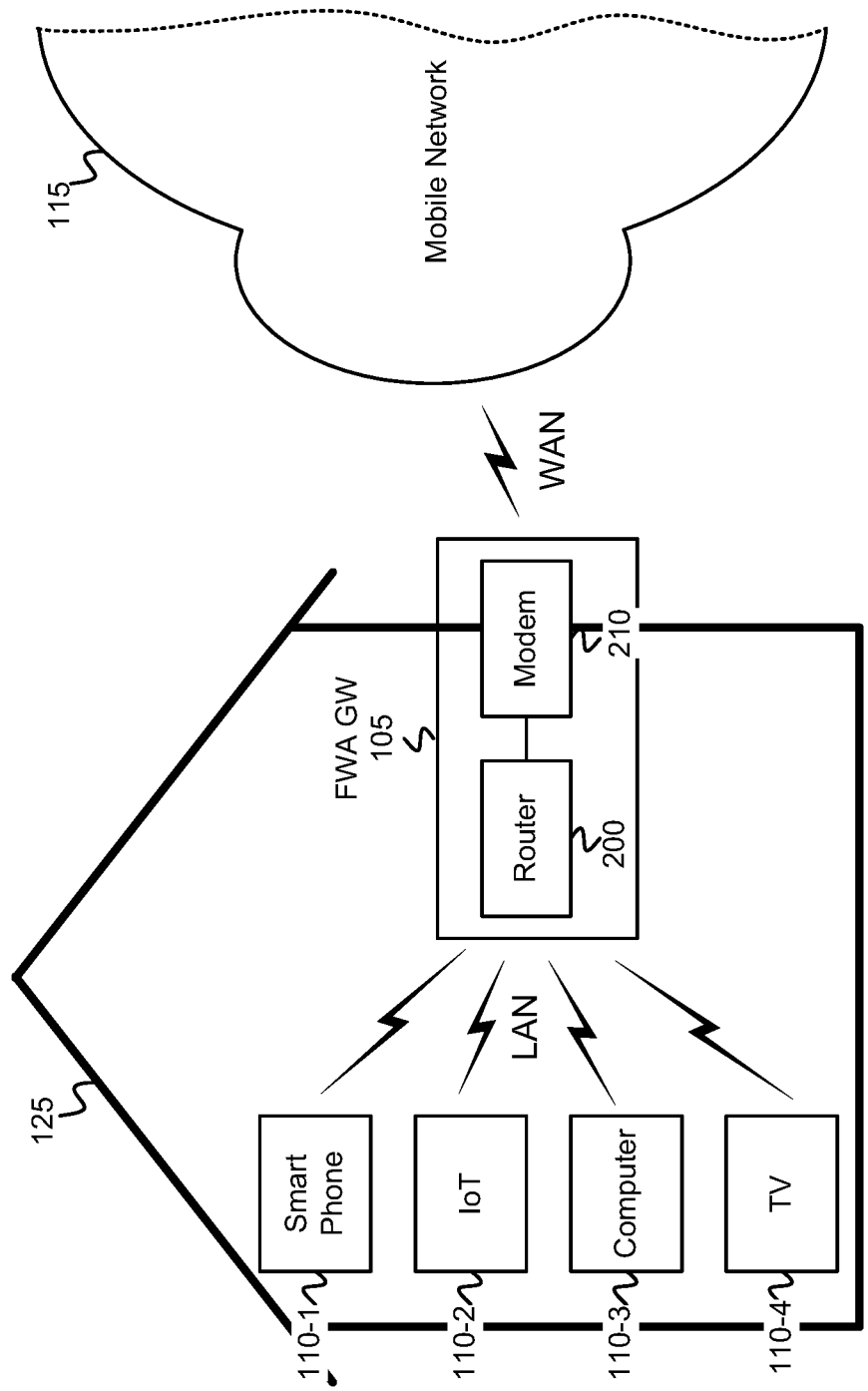
FIG. 2 illustrates the use of a FWA gateway at a particular residential/business location.

FIG. 2 illustrates the use of a FWA GW 105 at a particular residential/business location 125. As shown, location 125 includes different types of UEs, including a smart phone 110-1, an IoT device 110-2, a computer 110-3, and a television (TV) 110-4. Each of the UEs connects to FWA GW 105, also located at residential/business location 125, on a LAN side of GW 105. FWA GW 105 further connects to mobile network 115 on a WAN side of GW 105 using wireless (e.g., RF) signaling and mobile network communication protocols.

FWA GW 105 includes, among other components not shown, a router 200 and a modem 210. FWA GW 105, among other functions, obtains and stores information for potentially supported network slices for the mobile network 115, network slice-based NAT policies for the potentially supported network slices, and traffic classification information (e.g., classification rules) relating traffic types or parameters to particular network slices. In one implementation, the traffic classification rules may include a Domain Network Name (DNN) to network slice mapping. A router (not shown) of the FWA GW 105 may use the mapping of the traffic classification rules to request an appropriate network slice setup for a new session having a unique IP address. The unique IP address becomes the IP address of the network slice and may be used by the router of the FWA GW 105 to create its own traffic classification rules to map certain traffic into the network slice.

Router 200, for outgoing (upstream) traffic from the UEs 110-1 through 110-4, applies the obtained traffic classification information to the outgoing traffic to classify the traffic to one or more selected slices of the potentially supported network slices for mobile network 115. Router 200 also applies the obtained NAT policies to select a type of NAT from multiple different types of NAT based on the network slice(s) selected by the traffic classification. Subsequent to performing the selected type of NAT, router 200 forwards the outgoing traffic to modem 210 for wireless transmission to mobile network 115.

Further, router 200, for incoming (downstream) traffic from mobile network 115 destined for one or more of the UEs 110-1 through 110-4, applies the previously received NAT policies to select a type of NAT from multiple different types of NAT based on a network slice from which the traffic originates. A data unit(s) (e.g., a protocol data unit (PDU)) for the incoming traffic may include data (e.g., an IP address) that serves as a network slice identifier that identifies the network slice in mobile network 115 via which the traffic traversed the mobile network 115. Subsequent to performing the selected type of NAT, router 200 forwards the incoming traffic to the destination UE(s) identified by performance of the NAT.

Figure 3:
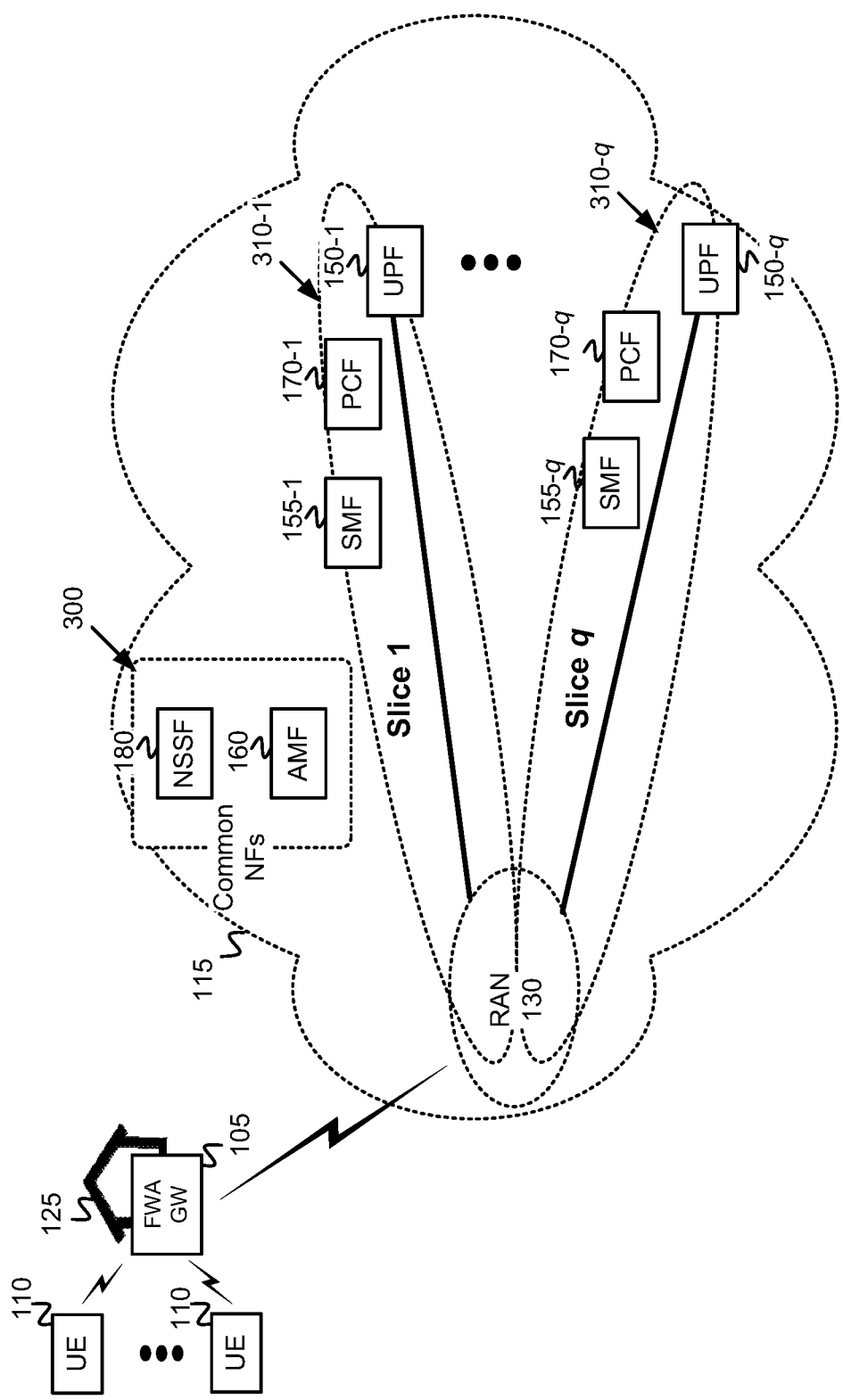
FIG. 3 depicts an example of the division of a mobile network into multiple network slices.

FIG. 3 depicts an example of the creation of network slices in mobile network 115. Each network slice of network slices 310-1 through 310-$q$ may include a logical end-to-end network, which may run on a shared physical infrastructure, that is created to serve a particular purpose and/or service data traffic with a particular set of performance parameters or characteristics. For example, each network slice of network slices 310-1 through 310-$q$ may service a particular service type and/or may satisfy or meet particular performance characteristics or parameters for sessions served by the network slice. In some implementations, each network slice may have a different Slice/Service Type (SST), such as, for example, an enhanced Mobile Broadband (eMBB) SST, an Ultra Reliable Low Latency Communications (URLLC) SST, or a Massive Internet of Things (MIOT) SST. Each network slice may, however, have a different SST not described herein.

As shown in FIG. 3, a group of common NFs 300 of mobile network 115 may service the different network slices 310-1 through 310-$q$ (where q is greater than or equal to two) and, therefore, may not be considered to be included within the network slices 310-1 through 310-$q$. In the example shown, the common NFs 300 of mobile network 110 include an AMF 160 and a NSSF 180.

Each network slice may include its own set of NFs, where each NF operates to service UE traffic sessions handled by that particular network slice. For example, as shown in FIG. 3, network slice 310-1 includes SMF 155-1, PCF 170-1, and UPF 150-1 that operate to service UE sessions within network slice 310-1. As a further example, network slice 310-$q$ includes SMF 155-$q$, PCF 170-$q$, and UPF 150-$q$ that operate to service UE sessions within network slice 210-$q$.

Figure 4:
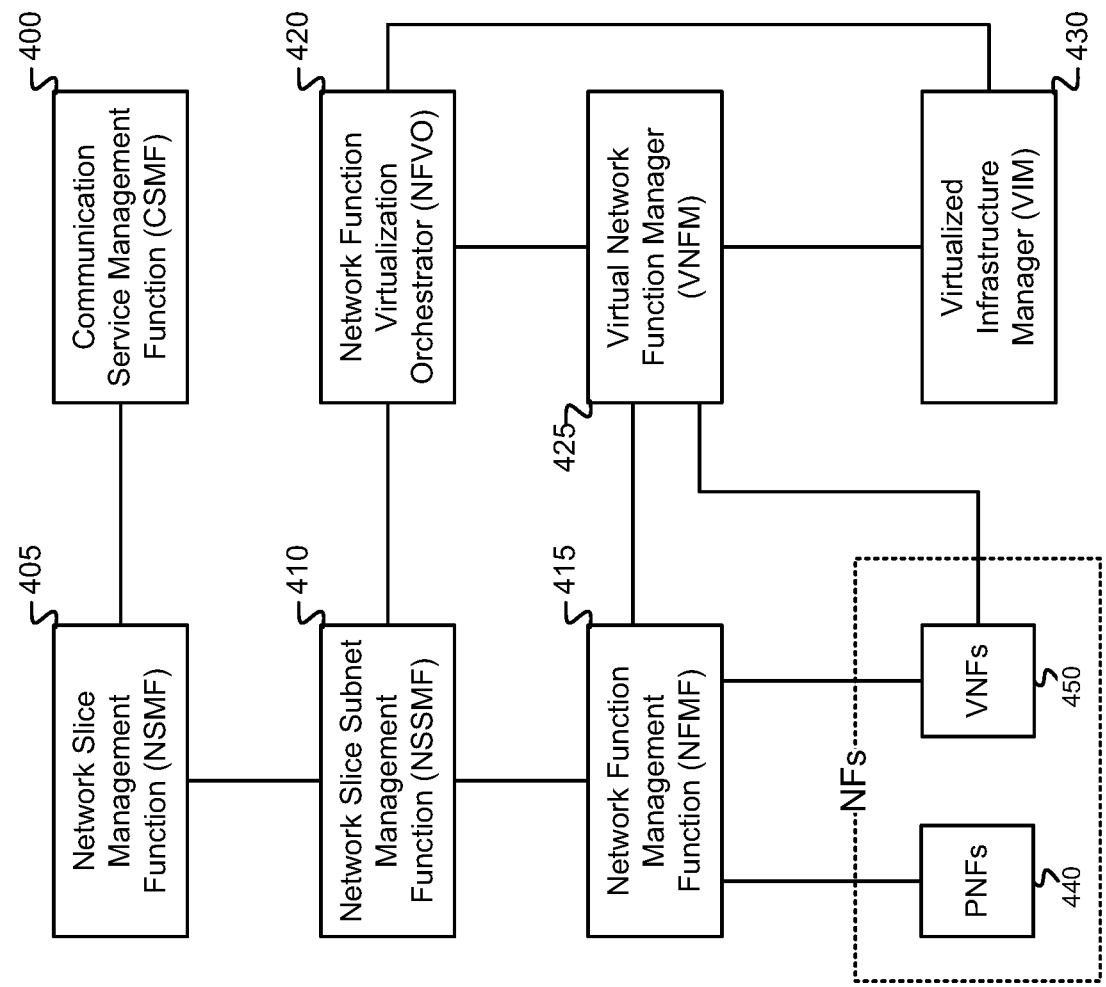
FIG. 4 illustrates exemplary components of a slice manager and orchestrator.

FIG. 4 illustrates exemplary components of the Slice Manager & Orchestrator 185 of FIG. 1. Slice Manager & Orchestrator 185 may include, among other functions, a Communication Service Management Function (CSMF) 400, a Network Slice Management Function (NSMF) 405, a Network Slice Subnet Management Function (NSSMF) 410, a Network Function Virtualization Orchestrator (NFVO) 420, a Network Function Management Function (NFMF) 415, a Virtual Network Function Manager (VNFM) 425, a Virtualized Infrastructure Manager (VIM) 430, and Network Functions (NFs) 440 and 450. The functions of Slice Manager & Orchestrator 185 may be executed by a single network device or may be executed by multiple network devices interconnected via a network and/or one or more links.

CSMF 400 includes NFs that provision and manage communication service instances within mobile network 110. CSMF 400 requests necessary resources to implement the communication service instances and carries out service assurance and Service Level Agreement (SLA) enforcement for each service instance in active operation.

NSMF 405 includes NFs that perform NSI monitoring, reporting, and life cycle management. NSMF 405, for example, performs network slice/NSI health monitoring, SLA assurance, and slice/NSI life cycle management. NSSMF 410 performs network slice subnet instance (NSSI) monitoring, reporting, and life cycle management. NSSMF 410, for example, performs alarm correlation and statistics aggregation at the slice subnet level, and NSSI life cycle management and provisioning according to the slice profile.

NFVO 420 includes NFs that perform resource and network service orchestration within mobile network 110. For resource orchestration, NFVO 420 oversees the allocation of resources and monitors the allocated resources. The resources may include compute resources (e.g., VNFs 450), storage resources, and network resources. The network resources may include ports, subnets, forwarding rules, etc. needed for inter-VNF communications. For network service orchestration, NFVO 420 manages VNF deployment, creates and terminates links/networks between VNFs, increases/decreases network service capacity, updates VNF forwarding information, and instantiates VNFs in coordination with VNFM 425.

NFMF 415 includes NFs that perform NF monitoring, reporting, and configuring. NFMF 415, for example, performs NF parameter configuration and provisioning. VNFM 425 includes NFs that perform life cycle management of VNFs, including VNF instantiation, scaling of VNFs, updating/upgrading of VNFs, and termination of VNFs. NFVO 420 coordinates with VNFM 425 to instantiate VNFs and manage the deployment of network services that are provided by VNFs. VNFM 425 further performs key performance indicator (KPI) monitoring. VIM 430 includes NFs that control and manage the NFV infrastructure (NFVI) compute resources, storage resources, and network resources in coordination with NFVO 420 and VNFM 425. NFs 440 and 450 may include Physical NFs (PNFs) 440 and VNFs 450. PNFs 440 include physical network nodes which have not undergone virtualization. Both PNFs 440 and VNFs 450 can be used to implement an overall network service.

The configuration of the components of Slice Manager & Orchestrator 185 of FIG. 4 is for illustrative purposes. Other configurations may be implemented. Therefore, Slice Manager & Orchestrator 185 may include additional, fewer and/or different components, arranged in a different configuration, than depicted in FIG. 4.

Figure 5:
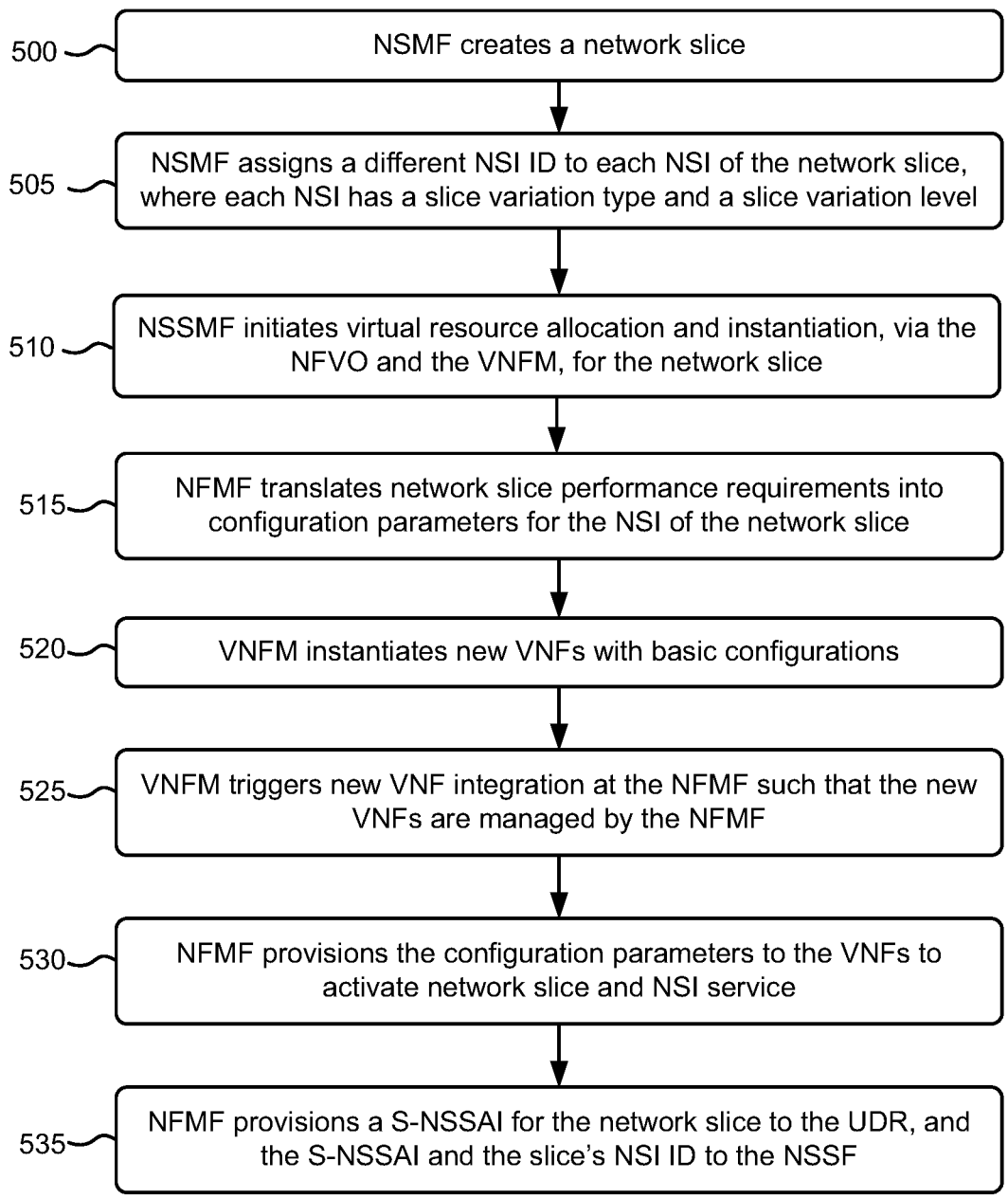
FIG. 5 is a flow diagram of an example process for creating, managing, and orchestrating, network slices within a mobile network.

FIG. 5 is a flow diagram of an example process for creating, managing, and orchestrating, network slices within mobile network 115. The example process of FIG. 5 may be implemented by Slice Manager & Orchestrator 185 for each network slice to be created and configured within mobile network 115. The example process of FIG. 5 is described with additional reference to FIG. 4.

The example process includes NSMF 405 of Slice Manager & Orchestrator 185 creating a network slice (block 500). Each network slice corresponds to a particular purpose and/or particular performance requirements. Creation of each network slice includes instantiating, allocating, provisioning, and/or configuring a set of NF instances, and required resources (e.g., compute, storage, and networking resources), for serving the overall purpose and/or performance requirements (e.g., bandwidth, latency, etc.) of the network slice. NSMF 405 designs and creates the network slice.

NSMF 405 further assigns a Network Slice Instance Identifier (NSI ID) to the network slice (block 505). A NSI includes a set of NF instances and the required resources (e.g., compute, storage, and networking resources) which form a deployed network slice. NSSMF 410 of Slice Manager & Orchestrator 185 initiates virtual resource allocation and instantiation, via the NFVO 420 and the VNFM 425, for the NSI of the network slice (block 510). NSSMF 410 works in coordination with NFVO 420 and VNFM 425 to allocate and instantiate the virtual resources for the network slice for servicing sessions within the requirements of the network slice.

NFMF 415 of Slice Manager & Orchestrator 185 translates slice performance requirements/parameters into configuration parameters for configuring virtual network resources of the NSI of the network slice (block 515). NFMF 415 determines, based on the allocated and instantiated virtual resources for the NSI, the configuration parameters for the virtual resources (e.g., compute, storage, and networking resources) that will assist in enabling the NSI to satisfy the network slice performance requirements (e.g., SLAs) when servicing UE sessions.

VNFM 425 of Slice Manager & Orchestrator 185 instantiates new VNFs with basic configurations (block 520) and triggers new VNF integration at the NFMF 415 such that the new VNFs are managed by the NFMF 415 (block 525). VNFM 425 determines what additional new VNFs need to be instantiated within each the NSI to assist in satisfying the slice performance requirements, and then instantiates the new VNFs, within the virtual resources, with basic configurations that can be provisioned, as described further below, with the configuration parameters determined in block 515.

NFMF 415 provisions the configuration parameters of block 515 to the VNFs to activate network slice and NSI service (block 530), and further provisions a S-NSSAI for the network slice to the UDR of UDM 175, and the S-NSSAI and the network slice's NSI ID to the NSSF 180 (block 535). NFMF 415 assigns the network slice an S-NSSAI value that uniquely identifies the network slice and obtains the NSI ID assigned in block 505. NFMF 415, or NSSF 180, may further send the potentially supported network slicing information (e.g., updated and currently configured S-NSSAIs, NSI IDs, other network slicing information) to other nodes in mobile network 115 including, for example, to AMFs 160. Each AMF 160 may, in turn, send the potentially supported network slicing information (e.g., updated and currently configured S-NSSAIs, NSI IDs, other network slicing information) to, for example, FWA GWs 105 currently active and connected to RAN 130 of mobile network 115. In one implementation, AMF 160 may "push" potentially supported configured network slicing information to FWA GWs 105 at, for example, particular intervals (e.g., periodically) or upon an occurrence of a particular event. In another implementation, FWA GWs 105 may "pull" potentially supported network slicing information from an AMF 160 by sending a request(s) to the AMF 160 (e.g., a registration request).

Figure 6:
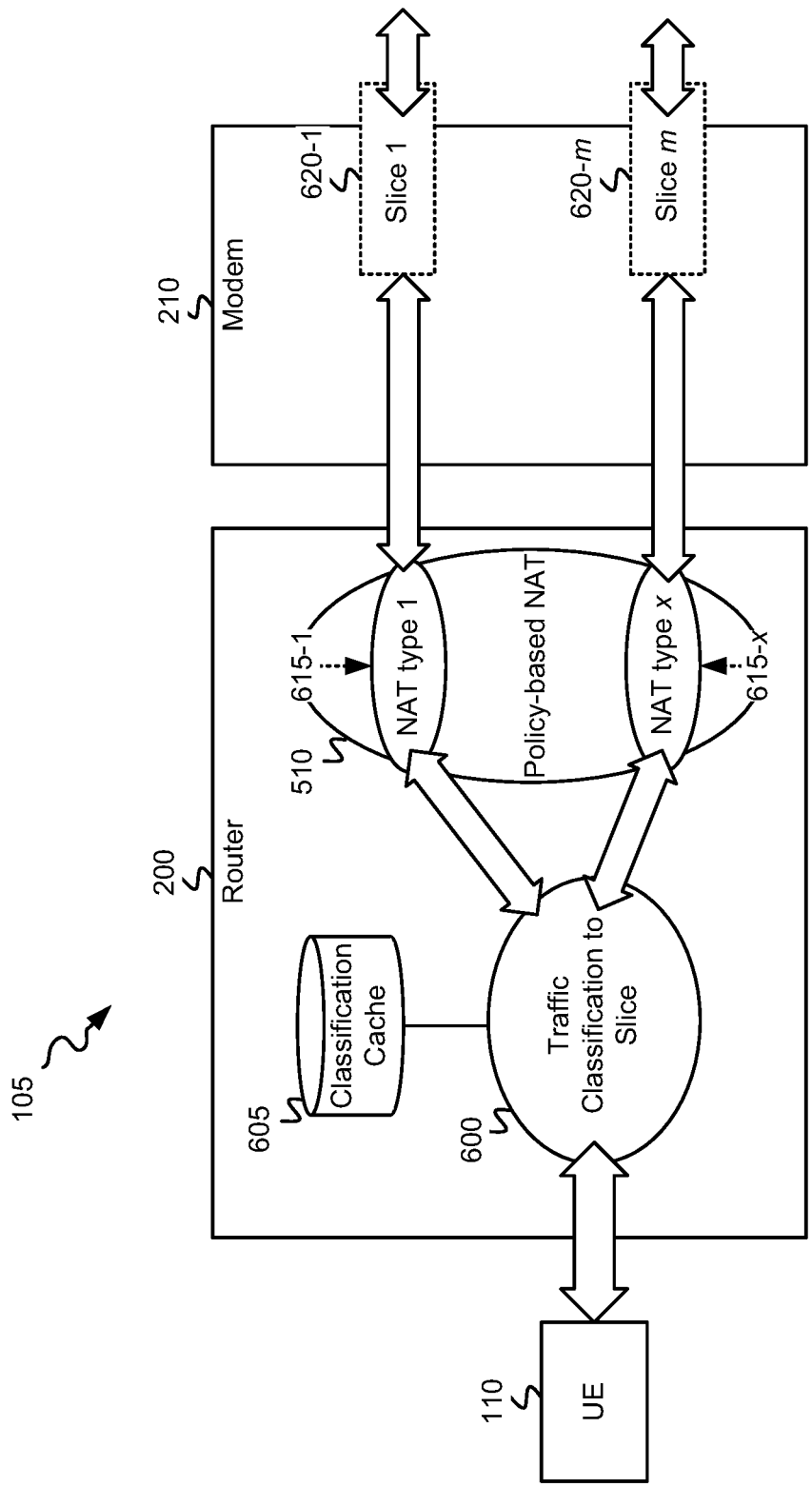
FIG. 6 illustrates an example of traffic classification and/or network sliced-based network address translation being performed by a FWA gateway for incoming traffic to a user equipment device, and outgoing traffic from the user equipment device.

FIG. 6 illustrates an example of traffic classification and/or network sliced-based NAT being performed by FWA GW 105 for incoming (downstream) traffic to UE 110, and outgoing (upstream) traffic from UE 110. For traffic heading upstream from the LAN-side of FWA GW 105, router 200 of FWA GW 105 receives traffic from UE 110, and applies traffic classification 600 to classify the traffic to one or more selected slices of multiple network slices. The multiple network slices may be, for example, a set of the network slices currently created and configured for mobile network 115 by slice manager and orchestrator 185. The traffic classification decision that classifies the traffic to the one or more selected network slices may be performed using one or more different classification processes. One traffic classification process may implement one or more policies that map certain traffic to a selected network slice(s) of multiple network slices. For example, the traffic classification process may implement policies that map traffic from a particular UE 110, or a particular application executed by the UE 110, to a particular network slice(s). In one implementation, the UE 110 may "mark" outgoing traffic with a traffic marking that the traffic classification process at FWA GW 105 can then map to a selected network slice(s). The traffic marking may include a network layer traffic marking (e.g., a DSCP tag) that indicates, for example, a type of the traffic, or indicates a type of network service desired for the traffic. As an example of traffic marking, a UE 110 may mark outgoing traffic with a particular DSCP tag, and the FWA GW 105 then maps the DSCP tag to a particular network slice using traffic classification policies. As another example of traffic classification, the traffic classification process may implement policies that identify a type of the payload of the traffic (e.g., video, audio, or text), and then map the identified type of payload to a selected network slice(s).

A further example of traffic classification involves the use of tokens to map traffic to a particular network slice(s). An application at a UE 110 registers the application and receives a token authorizing access to a particular network slice. The application at the UE 110, during session setup, would pass the received token to the router 200 at FWA GW 105 and router 200, upon inspection of the token, would map the UE application to the particular network slice of the potentially supported (e.g., currently configured) network slices.

Subsequent to traffic classification, router 200 marks the traffic in accordance with the selected network slice(s) to which the traffic is to be sent and applies NAT policy rules to the traffic to select a type of NAT from multiple different types of NAT, NAT type 1 615-1 through NAT type x 615-*x*, based on the selected network slice(s). Each network slice may be assigned a different network address, and router 200 of FWA GW 105 may select a type of NAT, from multiple different types of NAT, based on the network addresses of the network slices. The translations of the different types of NAT may involve different NAT mechanisms (e.g., NAT44 or NPTv6) to deal with network slices potentially supporting different Internet Protocol (IP) address types, such as IPv4 or IPv6, and depending on which IP type, of multiple IP types, that a particular application at a UE 110 is utilizing. For example, if the traffic classification results in a classification decision of network_slice_1, the NAT policy rules may include a rule that maps network_slice_1 to NAT44 network address translation. As another example, if the traffic classification results in a classification decision of network_slice_2, the NAT policy rules may include a rule that maps network_slice_2 to Network Prefix Translation (NPT) version 6 (NPTv6). The NAT policy rules may map the selected network slice(s) to other types of NAT (e.g., NAT66). Router 200 then performs the NAT determined by the NAT policy rules. The performed NAT may, for example, map the local address of the UE 110 that originated the traffic to a global Internet Protocol (IP) address to be used in mobile network 115 and/or data network 120. Router 200 may replace, in the header of the traffic, the local address of the UE 110 with the global IP address resulting from performing the selected type of NAT. Router 200 forwards the traffic on to modem 210. FIG. 6 shows performance of the policy-based NAT 510 mapping network slices to x different types of NAT (where x is greater than or equal to two), including NAT type 1 615-1 through NAT type x 615-*x*. Upon receipt of the traffic from router 200, modem 210 transmits the traffic (e.g., using RF signals) to mobile network 115 for handling by the network slice(s), of network slices 620-1 through 620-*m*, determined by the traffic classification.

For traffic heading downstream from the WAN-side of FWA GW 105, modem 210 receives traffic for a session, destined for a UE 110 connected to FWA GW 105, via RF signaling from RAN 130 from a network slice, of network slices 620-1 through 620-*m*, of mobile network 115. Modem 210 forwards the traffic to router 200, and router 200 applies NAT policy rules to the traffic to select a type of NAT from multiple different types of NAT based on the network slice identified for the traffic and based on the IP address type in use. In certain circumstances, a single network slice can support, for example, both IPv4 and IPV6, and the NAT type (e.g., NAT44 vs. NPT66) to be selected for network address translation would depend on what IP type is being used by the traffic. As an example, a header of data units of the traffic may include a network slice ID that identifies the network slice over which the traffic traversed through mobile network 115, and an IP type of the data unit(s). If, for example, the traffic identifies network_slice_1 and an IP type of IPV4, the NAT policy rules may include a rule that maps network_slice_1 and the IP type of IPV4 to NAT44 network address translation, If, as a further example, the traffic identifies network_slice_1 and an IP type of IPV6, the NAT policy rules may include a rule that maps network_slice_1 and the IP type of IPV6 to NPT66 network address translation. As another example, if the traffic identifies network_slice_2, the NAT policy rules may include a rule that maps network_slice_2 to a particular local IP address using either NPTv6 or NAT44, depending on the IP type in use. As previously described, the NAT policy rules may map the selected network slice(s) using other types of NAT not described herein. Router 200 then performs the NAT determined by the NAT policy rules. The performed NAT may, for example, map the global IP address used to route the traffic to FWA GW 105 to a local address of the destination UE 110 on the LAN side of FWA GW 105. Router 200 may replace the global IP address originally contained in the header of the traffic with the local address of the destination UE 110 on the LAN side of FWA GW 105. Subsequent to performance of the selected type of NAT, router 200 forwards the traffic to the destination UE 110 at its local address on the LAN side of FWA GW 105.

Figure 7:
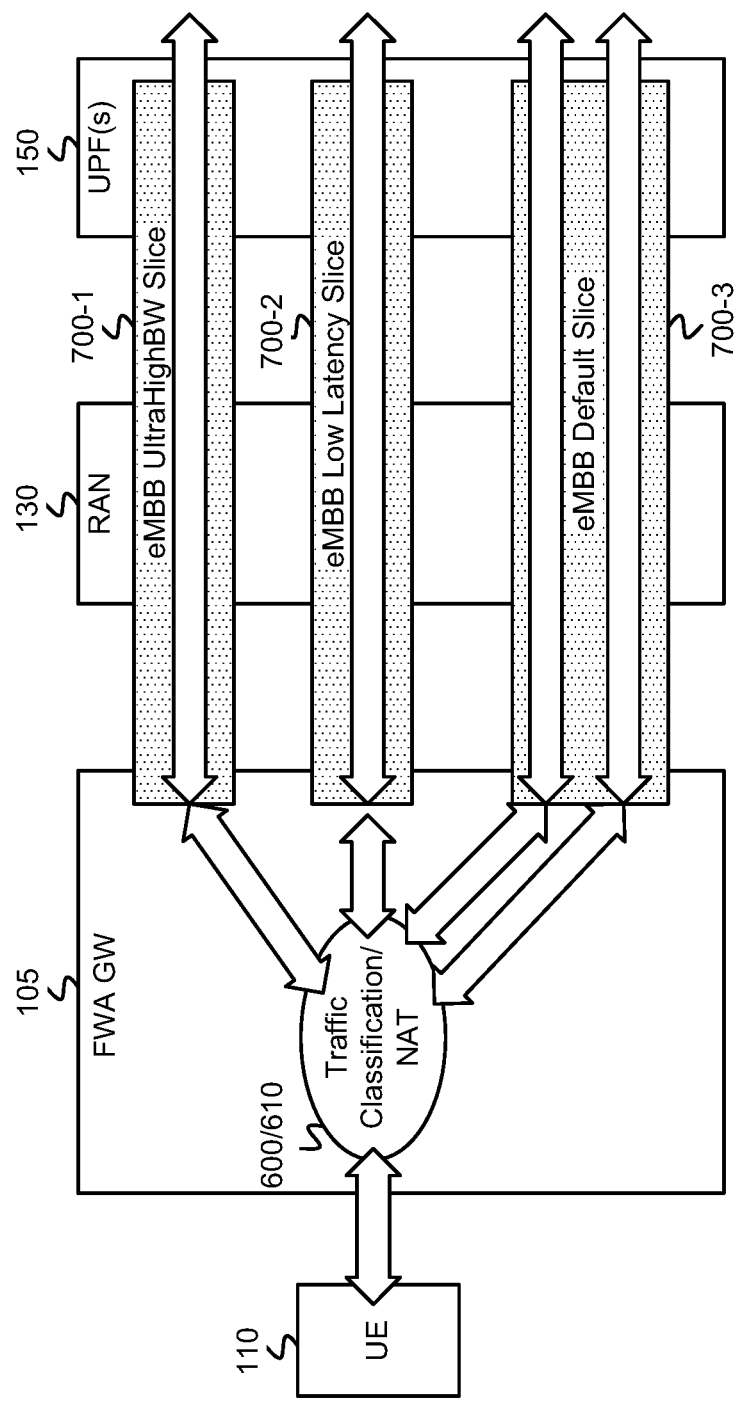
FIG. 7 depicts an example of the performance of traffic classification and/or network slicing-based network address translation for multiple network slices configured to serve session traffic that requires enhanced Mobile Broadband service.

FIG. 7 depicts an example of the performance of traffic classification and/or network slicing-based NAT for multiple particular network slices configured to serve session traffic that requires enhanced Mobile Broadband (eMBB) service. The example of FIG. 7 shows three network slices, potentially supported and/or currently configured in mobile network 115, for which FW GW 105 stores network slicing information: an eMBB Ultrahigh bandwidth (BW) slice 700-1, an eMBB low latency slice 700-2, and an eMBB default slice 700-3. Other types of session traffic may be served with dedicated network slices such as, for example, session traffic requiring Ultra Reliable Low Latency Communications (URLLC) service, or session traffic requiring Massive Machine Type Communications (mMTC). Network slice 700-1 supplies a higher bandwidth mobile broadband service to session traffic above and beyond the bandwidth provided by standard eMBB service. Network slice 700-2 provides a lower bandwidth eMBB service, and network slice 700-3 is a default eMBB network slice that provides standard eMBB service at a certain bandwidth to traffic sessions across mobile network 115, such as across RAN 130 and UPF 150 of core network 135.

In the example of FIG. 7, FWA GW 105 performs traffic classification 500 and network slice-based NAT 610 on upstream traffic from UE 110 before the traffic is transmitted across mobile network 115, including across RAN 130 and a UPF 150, via a selected one of eMBB UltraHigh BW slice 700-1, eMBB Low Latency slice 700-2, or eMBB default slice 700-3. In the example depicted, FWA GW 105 further receives downstream traffic at FWA GW 105 from one of eMBB UltraHigh BW slice 700-1, eMBB Low Latency slice 700-2, or eMBB default slice 700-3, and performs network slice-based NAT 610 before forwarding the traffic to the destination UE 110.

Figure 8:
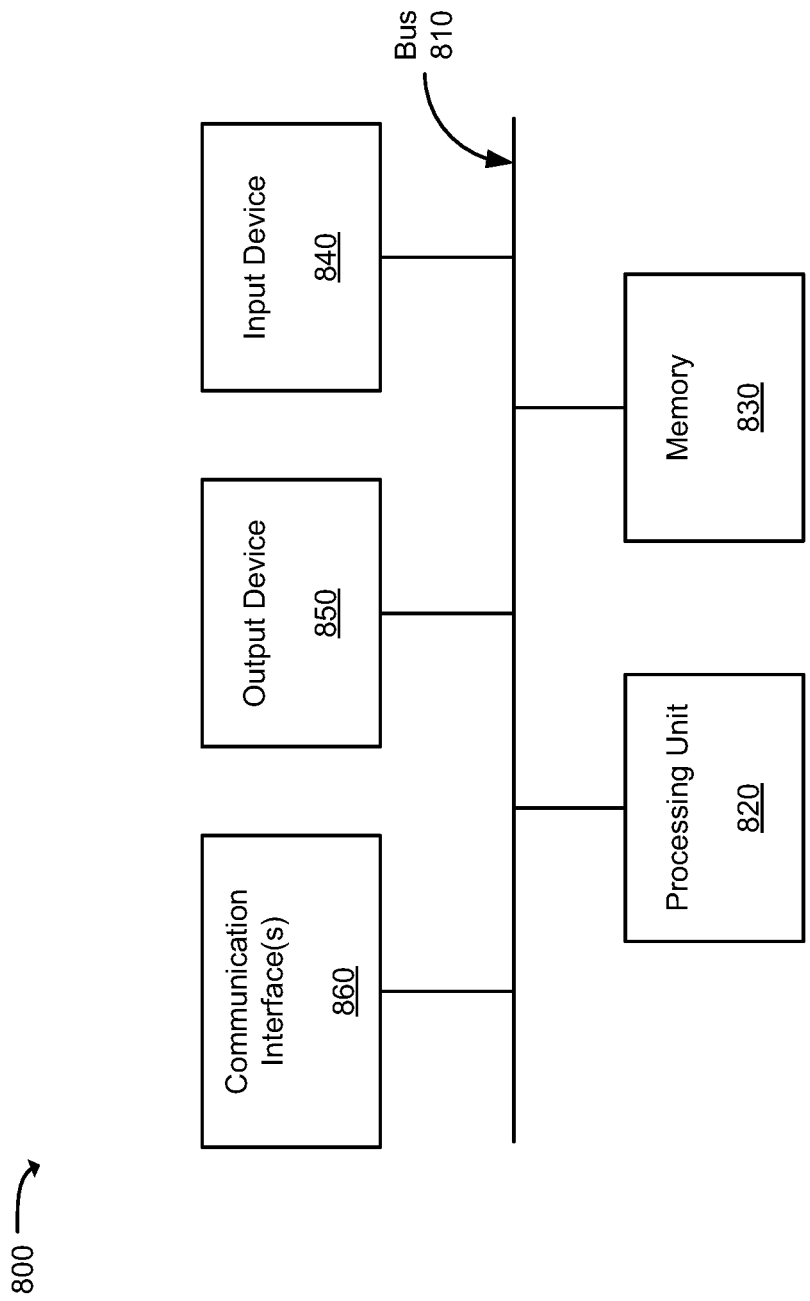
FIG. 8 is a diagram that depicts example components of a network device.

FIG. 8 is a diagram that depicts exemplary components of a network device 800 (referred to herein as a "network device" or a "device"). UEs 110, FWA GWs 105, slice manager and orchestrator 185, DUs and CU 140 may include components that are the same as, or similar to, those of device 800 shown in FIG. 8. Furthermore, each of the network functions UPF 150, SMF 155, AMF 160, NRF 165, PCF 170, UDM 175, and NSSF 180 may be implemented by a network device that includes components that are the same as, or similar to, those of device 800. Some of the NFs UPF 150, SMF 155, AMF 160, NRF 165, PCF 170, UDM 175, and NSSF 180 may be implemented by a same device 800 within mobile network 115, while others of the functions may be implemented by one or more separate devices 800 within mobile network 115.

Device 800 may include a bus 810, a processing unit 820, a memory 830, an input device 840, an output device 850, and a communication interface(s) 860. Bus 810 may include a path that permits communication among the components of device 800. Processing unit 820 may include one or more processors or microprocessors which may interpret and execute instructions, or processing logic. In the case of FWA GW 105, processing unit 820 may execute one or more functions associated with router 200. Memory 830 may include one or more memory devices for storing data and instructions. Memory 830 may include a random access memory (RAM) or another type of dynamic storage device that may store information and instructions for execution by processing unit 820, a Read Only Memory (ROM) device or another type of static storage device that may store static information and instructions for use by processing unit 820, and/or a magnetic, optical, or flash memory recording and storage medium. The memory devices of memory 830 may each be referred to herein as a "tangible non-transitory computer-readable medium," "non-transitory computer-readable medium," or "non-transitory storage medium." In some implementations, the processes/methods set forth herein can be implemented as instructions that are stored in memory 830 for execution by processing unit 820.

Input device 840 may include one or more mechanisms that permit an operator to input information into device 800, such as, for example, a keypad or a keyboard, a display with a touch sensitive panel, voice recognition and/or biometric mechanisms, etc. Output device 850 may include one or more mechanisms that output information to the operator, including a display, a speaker, etc. Input device 840 and output device 850 may, in some implementations, be implemented as a user interface (UI) that displays UI information and which receives user input via the UI. Communication interface 860 may include a transceiver(s) that enables device 800 to communicate with other devices and/or systems. For example, communication interface 860 may include one or more wired and/or wireless transceivers for communicating via mobile network 115 and/or data network 120. In the case of DUs of RAN 130, communication interface(s) 860 may further include one or more antenna arrays for producing radio frequency (RF) cells or cell sectors of mobile network 115 for communicating with FWA GWs 105 and/or UEs 110. In the case of FWA GWs 105, communication interface(s) 860 may include a wireless LAN interface (e.g., a Wi-Fi interface), a personal area network (PAN) interface (e.g., Bluetooth), and/or a wired LAN interface, and additionally may include modem 210 and at least one antenna for sending and receiving RF signals via the RF cells/cell sectors of mobile network 115. In the case of UEs 110, communication interface(s) 860 may include a wireless LAN interface, a PAN interface, and/or a wired LAN interface for connecting to FWA GW 105. Some UEs 110 may additionally include an RF transceiver for sending and receiving RF signals to FWA GW 105 and/or DUs of RAN 130.

The configuration of components of network device 800 illustrated in FIG. 8 is for illustrative purposes. Other configurations may be implemented. Therefore, network device 800 may include additional, fewer and/or different components, that may be arranged in a different configuration, than depicted in FIG. 8.

Figure 9:
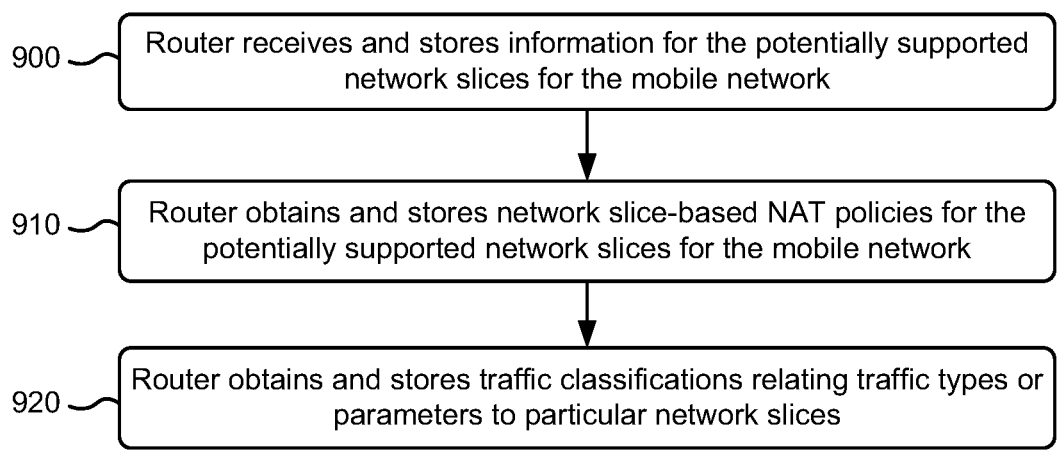
FIG. 9 is a flow diagram that illustrate an example process for a FWA gateway to receive and store information for potentially supported network slices of the mobile network, network address translation policies based on the potentially supported network slices, and traffic classifications for classifying traffic to the potentially supported network slices.

FIG. 9 is a flow diagram that illustrates an example process for FWA GW 105 to receive and store information associated with potentially supported network slices in mobile network 115, NAT policies based on the potentially supported network slices, and traffic classifications for classifying traffic to potentially supported network slices of mobile network 115. The example process of FIG. 9 may be implemented by FWA GW 105.

The example process includes router 200 of FWA GW 105 receiving and storing information for the potentially supported network slices for mobile network 115 (block 900). FWA GW 105 may receive network slice information such as, for example, each currently configured network slice's S-NSSAI and NSI ID, from NFMF 415 or NSSF 180, or from another node in mobile network 115 that maintains complete and updated records of the network slices currently created and configured within mobile network 115.

Router 200 of FWA GW 105 obtains and stores network slice-based NAT policies for the potentially supported network slices for mobile network 115 (block 910). In one implementation, router 200 may itself generate the network slice-based NAT policies, either independently or based on externally received policy information. Additionally, or alternatively, router 200 may receive the network slice-based NAT policies via, for example, a network administrator, or from another node in mobile network 115 that maintains updated network slice-based NAT policies that are to be pushed out to the FWA GWs 105 connected to RAN 130 of mobile network 115. In other implementations, each FWA GW 105 may pull updated network slice-based NAT policies from a node in mobile network 115 periodically, upon the occurrence of a triggering event, or upon power-up of the device.

Router 200 of FWA GW 105 obtains and stores traffic classifications (e.g., descriptions or a list) relating traffic types or parameters to particular network slices (block 920). In one implementation, router 200 may itself generate the traffic classifications by analyzing marked traffic (e.g., DSCP marking) or by analyzing parameters of a particular traffic flow. Additionally, or alternatively, router 200 may receive the traffic classifications that relate traffic types/parameters to network slices from a network administrator, or from another node in mobile network 115 that maintains updated traffic classifications that are to be pushed out to the FWA GWs 105 connected to RAN 130 of mobile network 115. Alternatively, each FWA GW 105 may pull updated traffic classifications from a node in mobile network 115 periodically, upon the occurrence of a triggering event, or upon power-up of the device.

The blocks of FIG. 9 may be repeated (e.g., periodically) based, for example, on changes and/or additions to the potentially supported network slices for mobile network 115, changes or updates to the NAT policies for the potentially supported configured network slices, or changes or updates to the traffic classifications.

Figure 10:
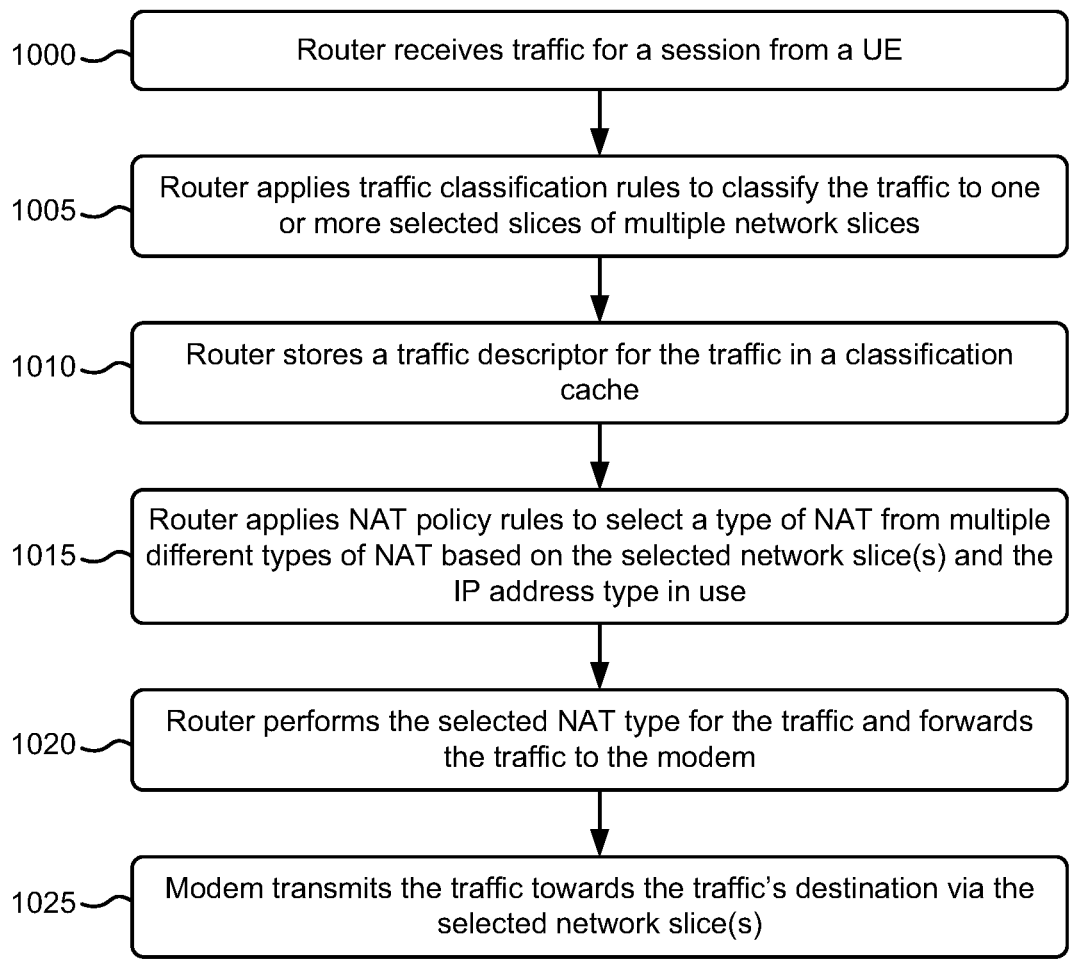
FIG. 10 is a flow diagram that illustrates an example process for performing traffic classification and network slice-based network address translation for upstream traffic received from a user equipment device at a FWA gateway.

FIG. 10 is a flow diagram that illustrates an example process for performing traffic classification and network slice-based NAT for upstream traffic received from a UE 110 at a FWA GW 105. The example process of FIG. 10 may be implemented by FWA GW 105. The exemplary process of FIG. 10 is described below with reference to the diagram of FIG. 11.

The example process includes router 200 of FWA GW 105 receiving traffic for a session for a UE 110 (block 1000). FWA GW 105 receives data units of a traffic session from a UE 110 connected on the LAN side of FWA GW 105, and forwards the data units to router 200.

Figure 11:
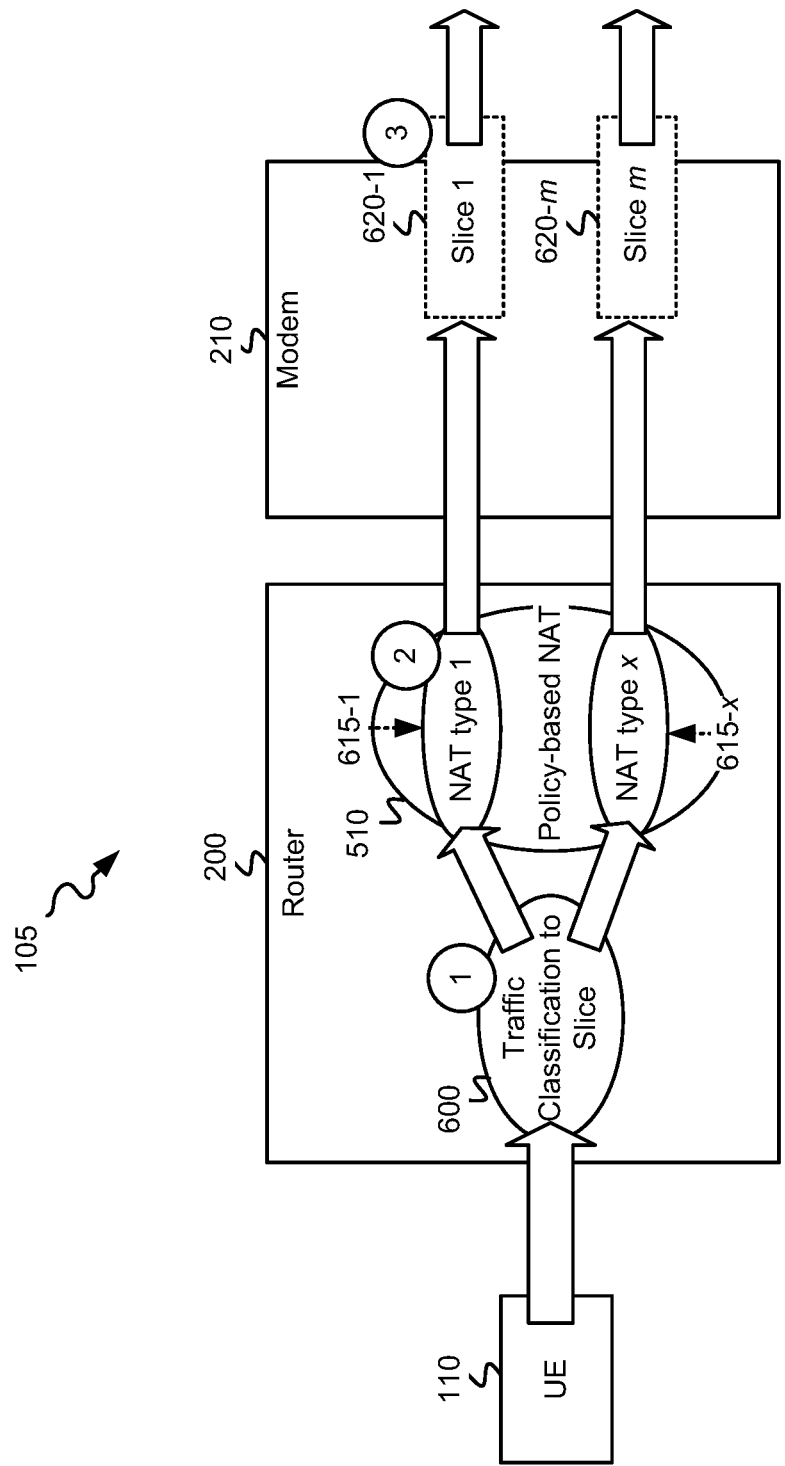
FIG. 11 illustrates an example of traffic classification and network slice-based network address translation being performed by the FWA gateway in the example process of FIG. 10.

Router 200 of FWA GW 105 applies traffic classification rules to classify the traffic to one or more selected slices of multiple network slices (block 1005), and stores a traffic descriptor for the traffic in classification cache 605 (block 1010). Router 200 obtains traffic classification rules stored in memory 830 and applies the rules to classify the traffic of the UE session to one or more selected network slices. Router 200 may additionally obtain information, from memory 830, regarding a set of network slices potentially supported by mobile network 115. In one implementation, the set of network slices may include a set of all network slices currently configured in mobile network 115. In another implementation, the set of network slices may include a sub-set of network slices from the complete set of network slices currently configured in, or potentially supported by, mobile network 115 (e.g., a sub-set of network slices dedicated to FWA use). The traffic classification rules may have been previously received by FWA GW 105 in block 920, and the information regarding the set of network slices in block 900, of the example process of FIG. 9. The traffic descriptor may, for example, identify the selected (or identified) network slice(s), and possibly one or more of the following: an ID of the UE, or session identification information (e.g., identifies the two endpoints of the session, and possibly a unique session ID). The traffic descriptor may additionally, or alternatively, identify a type of the traffic, or a type of network service desired for the traffic, that may have been obtained, for example, from a network layer traffic marking (e.g., a DSCP tag) that marks the traffic. In one implementation, the UE 110 may "mark" outgoing traffic with a traffic marking, such as, for example, a DSCP tag. FIG. 11 shows router 200 of FWA GW 105 performing (identified with a "1" within a circle) traffic classification 600 to classify upstream traffic received from UE 110 and heading to a destination in mobile network 115 or data network 120.

Router 200 of FWA GW 105 applies NAT policy rules to select a type of NAT from multiple different types of NAT based on the selected network slice(s) and the IP address type in use (block 1020). The NAT policy rules may, for example, include conditional rules that relate the selected network slice(s) and/or IP address type to a selected type of NAT, from multiple different types of NAT, to be performed on the traffic. For example, if the traffic identifies network_slice_1 and an IP type of IPV4, the NAT policy rules may include a rule that maps network_slice_1 and the IP type of Ipv4 to NAT44 network address translation. As a further example, if the traffic identifies network_slice_1 and an IP type of Ipv6, the NAT policy rules may include a rule that maps network_slice_1 and the IP type of Ipv6 to NPT66 network address translation. As another example, if the traffic identifies network_slice_2, the NAT policy rules may include a rule that maps network_slice_2 to a particular local IP address using either NPTv6 or NAT44, depending on the IP type in use.

Router 200 of FWA GW 105 performs the selected NAT type for the traffic and forwards the traffic to the modem 210 (block 1025). The performed NAT may, for example, map the local address of the UE 110 that originated the session traffic to a public, global IP address to be used in mobile network 115 and/or data network 120. Router 200 may replace, in the header of the session traffic, the private, local address of the UE 100 with the public, global IP address resulting from performing the selected type of NAT. FIG. 11 shows router 200 of FWA GW 105 performing (identified with a "2" within a circle) a selected NAT type (e.g., one of NAT type 615-1 through NAT type 615-*x*) to perform network address translation to, for example, translate UE 110's private, local address to a public, global IP address.

Modem 210 transmits the traffic towards the traffic's destination via the selected network slice(s) (block 1030). Modem 210 transmits the traffic via the selected network slice(s) using, for example, an RF transmitter of communication interface 860. A DU of RAN 130 may receive the transmitted traffic and forward the traffic to core network 135 of mobile network 115. FIG. 11 shows modem 210 of FWA GW 105 transmitting (identified with a "3" within a circle) traffic, for which NAT type 615-1 was performed, to network slice 620-1, and transmitting traffic, for which NAT type 615-*x* was performed, to network slice 620-*m*.

Figure 12:
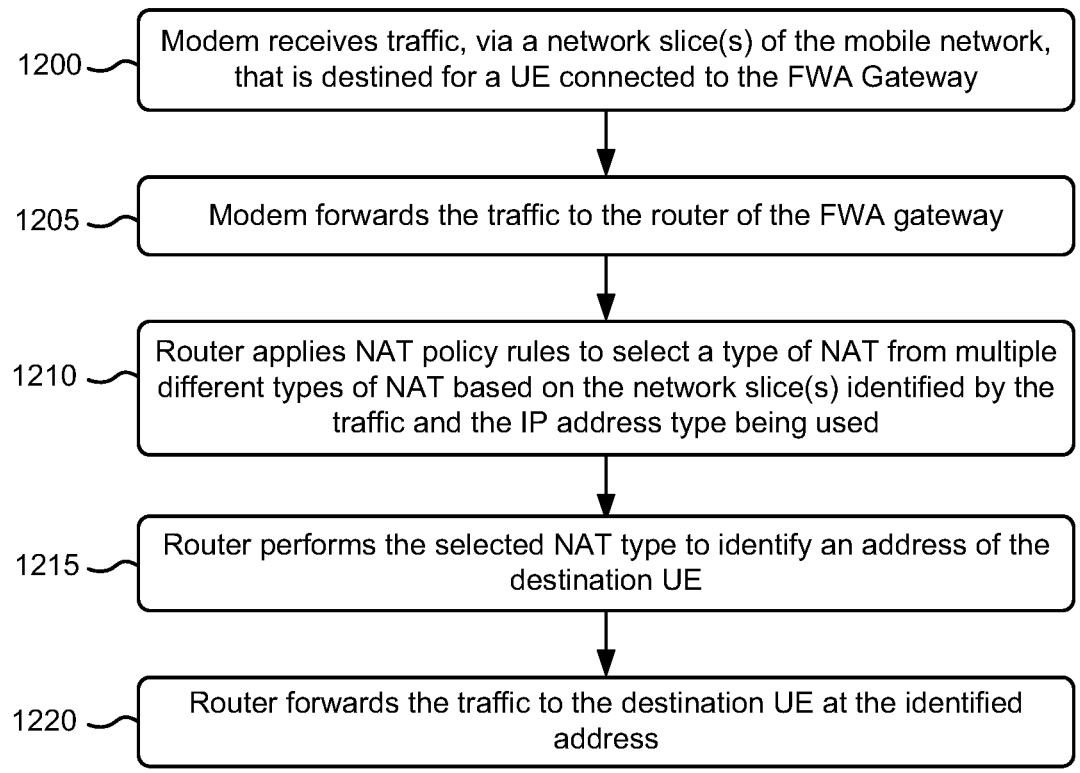
FIG. 12 is a flow diagram that illustrates an example process for performing network slice-based network address translation for downstream traffic, destined for a user equipment device connected to a local area network side of a FWA gateway.

FIG. 12 is a flow diagram that illustrates an example process for performing network slice-based NAT for downstream traffic, destined for a UE 110 connected on a LAN side of FWA GW 105, and received from a DU of RAN 130 of mobile network 115. The example process of FIG. 12 may be implemented by FWA GW 105. The example process of FIG. 12 is described below with reference to the diagram of FIG. 13.

Figure 13:
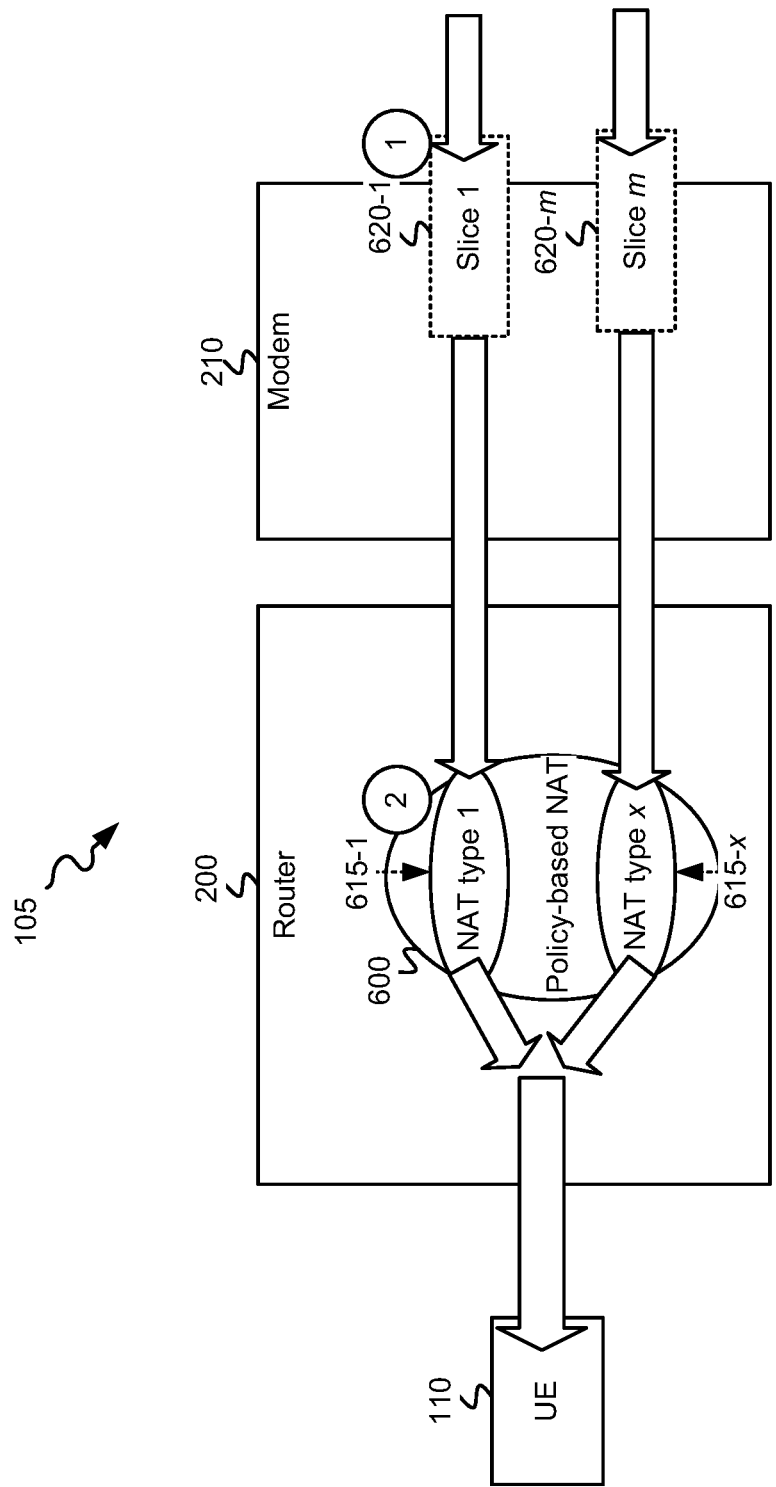
FIG. 13 illustrates an example of network slice-based network address translation being performed by the FWA gateway in the example process of FIG. 12.

The example process includes modem 210 of FWA GW 105 receiving traffic, from a network slice(s) of mobile network 115, that is destined for a UE 110 connected to the FWA GW 105 (block 1200) and forwards the traffic to the router 200 of the FWA GW 105 (block 1205). Modem 210 receives the traffic, from a DU of RAN 130 of mobile network 115 via a network slice, using, for example, an RF receiver of communication interface 860. Modem 210 forwards the received traffic to router function 200 of FWA GW 105. FIG. 13 shows modem 210 of FWA GW 105 receiving (identified with a "1" within a circle) traffic from network slice 620-1, and from network slice 620-*m*.

Router 200 of the FWA GW 105 applies NAT policy rules to select a type of NAT from multiple different types of NAT based on the network slice(s) identified by the traffic and the IP address type being used (block 1210) and performs the selected NAT type to identify an address of the destination UE (block 1215). A header of data units of the traffic may include data that may identify the particular network slice over which the traffic was received from mobile network 115. In one implementation, for downstream traffic, an IP address (e.g., the global IP address used to route the traffic to the FWA GW 105) in the header(s) of the traffic may be used as an identifier of the particular network slice over which the traffic was received from mobile network 115. As one example, if the traffic identifies network_slice_1, the NAT policy rules may include a rule that maps network_slice_1 to use of NAT44 for network address translation. As another example, if the traffic identifies network_slice_2, the NAT policy rules may include a rule that maps network_slice_2 to use of NPTv6 for network address translation. The NAT policy rules may map the identified network slice to the use of other types of NAT. The selected NAT, when performed, may, for example, map the public, global IP address used to route the traffic to FWA GW 105 to a private, local address of the destination UE 110 on the LAN side of FWA GW 105. For downstream traffic destined for a same UE 110 received over multiple network slices, the selected NAT may map the public, global IP address to a same UE address (e.g., an IPV4 or IPv6 address), depending on whether the application at the UE 110 is using IPv4 or IPv6. Additionally, for downstream traffic, the selected NAT may map the public, global IP address to the UE's local IP address independent of the network slice over which the traffic traversed (i.e., the UE 110 may not have multiple IPs for each network slice). FIG. 13 shows router 200 of FWA GW 105 performing (identified with a "2" within a circle) a selected NAT type (e.g., one of NAT type 615-1 through NAT type 615-*x*) to perform network address translation to, for example, translate UE 110's global IP address to a local address on the LAN side of FWA GW 105.

Router 200 of the FWA GW 105 forwards the traffic to the destination UE 110 at the identified address (block 1220). Subsequent to performance of the selected type of NAT, router 200 may replace the public, global IP address originally contained in the header of the traffic with the NAT determined private, local address of the destination UE 110 on the LAN side of FWA GW 105. Router 200 then forwards the traffic to the destination UE 110 at the local address determined by performance of the NAT.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5, 9, 10, and 12, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 820) of a device. A non-transitory storage medium includes one or more of the storage mediums described in relation to memory 830. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a Fixed Wireless Access (FWA) gateway wirelessly connected to a radio access network (RAN) of a mobile network on a first side of the FWA gateway and connected to a local area network (LAN) on a second side of the FWA gateway, traffic for a user equipment device (UE) connected to the FWA gateway via the LAN;
   identifying, by the FWA gateway, a network slice, from a set of network slices potentially supported by the mobile network, for the traffic;
   applying, by the FWA gateway, network address translation (NAT) policy rules to select a NAT type from multiple different NAT types to perform for the traffic based on the identified network slice;
   performing, by the FWA gateway, the selected NAT type for the traffic; and
   transmitting, wirelessly by the FWA gateway, the traffic towards the traffic's destination via the RAN.

2. The method of claim 1, wherein applying the NAT policy rules to select the NAT type comprises:
   selecting a first NAT type for the traffic if the identified network slice comprises a first network slice; and
   selecting a second NAT type for the traffic if the identified network slice comprises a second network slice.

3. The method of claim 2, wherein the first NAT type comprises one of NAT44, Network Prefix Translation version 6 (NPTv6), or NAT66, and wherein the second NAT type comprises one of NAT44, NPTv6, or NAT66.

4. The method of claim 1, wherein identifying the network slice comprises:
   receiving, by the FWA gateway via the LAN, the traffic from the UE; and
   applying, by the FWA gateway, traffic classification rules to the traffic to select the network slice from the set of network slices potentially supported by the mobile network for the traffic from the UE.

5. The method of claim 1, wherein identifying the network slice comprises:
   receiving, by the FWA gateway, traffic destined for the UE from the RAN of the mobile network; and
   determining the network slice based on data contained in the traffic.

6. The method of claim 1, further comprising:
   storing, by the FWA gateway, a traffic descriptor for the traffic in a classification cache.

7. The method of claim 1, wherein the FWA gateway comprises a residential gateway (RG).

8. A Fixed Wireless Access (FWA) gateway wirelessly connected to a Radio Access Network (RAN) of a mobile network on a first side of the FWA gateway and connected to a local area network (LAN) on a second side of the FWA gateway, comprising:
   a modem; and
   a router configured to:
      receive traffic for a user equipment device (UE) connected to the FWA gateway via the LAN,
      identify a network slice, from a set of network slices potentially supported by the mobile network, for the traffic,
      apply network address translation (NAT) policy rules to select a NAT type from multiple different NAT types to perform for the traffic based on the identified network slice,
      perform the selected NAT type for the traffic; and
      forward the traffic to the modem for transmitting towards the traffic's destination via the RAN.

9. The FWA gateway of claim 8, wherein, when applying the NAT policy rules, the router is further configured to:
   select a first NAT type for the traffic if the identified network slice comprises a first network slice, and
   select a second NAT type for the traffic if the identified network slice comprises a second network slice.

10. The FWA gateway of claim 9, wherein the first NAT type comprises one of NAT44, Network Prefix Translation version 6 (NPTv6), or NAT66, and wherein the second NAT type comprises one of NAT44, NPTv6, or NAT66.

11. The FWA gateway of claim 8, wherein, when identifying the network slice, the router is configured to:
   receive the traffic from the UE via the LAN; and
   apply traffic classification rules to the traffic to select the network slice from the set of network slices potentially supported by the mobile network for the traffic.

12. The FWA gateway of claim 8, wherein, when identifying the network slice, the router is configured to:

receive traffic destined for the UE from the RAN of the mobile network; and determine the network slice based on data contained in the traffic.

13. The FWA gateway of claim 8, wherein the router is further configured to:

store a traffic descriptor for the traffic in a classification cache.

14. The FWA gateway of claim 8, wherein the FWA gateway comprises a residential gateway (RG).

15. A non-transitory storage medium storing instructions executable by a Fixed Wireless Access (FWA) gateway connected to a radio access network (RAN) of a mobile network on a first side of the FWA gateway and to a local area network (LAN) on a second side of the FWA gateway, wherein the instructions comprise instructions to cause the FWA gateway to:

receive traffic for a user equipment device (UE) connected to the FWA gateway via the LAN;

identify a network slice, from a set of network slices potentially supported by the mobile network, for the traffic;

apply network address translation (NAT) policy rules to select a NAT type from multiple different NAT types to perform for the traffic based on the identified network slice;

perform the selected NAT type for the traffic; and transmit the traffic towards the traffic's destination UE via the RAN.

16. The non-transitory storage medium of claim 15, wherein the instructions to cause the FWA gateway to apply NAT policy rules further comprise instructions to cause the FWA gateway to:

select a first NAT type for the traffic if the identified network slice comprises a first network slice; and select a second NAT type for the traffic if the identified network slice comprises a second network slice, wherein the first NAT type comprises one of NAT44, Network Prefix Translation version 6 (NPTv6), or NAT66, and wherein the second NAT type comprises one of NAT44, NPTv6, or NAT66.

17. The non-transitory storage medium of claim 15, wherein the instructions to cause the FWA gateway to identify the network slice further comprise instructions to cause the FWA gateway to:

receive the traffic from the UE via the LAN; and apply traffic classification rules to the traffic to select the network slice from the set of network slices potentially supported by the mobile network for the traffic from the UE.

18. The non-transitory storage medium of claim 15, wherein the instructions to cause the FWA gateway to identify the network slice further comprise instructions to cause the FWA gateway to:

receive traffic destined for the UE from the RAN of the mobile network; and determine the network slice based on data contained in the traffic.

19. The non-transitory storage medium of claim 15, wherein the instructions further comprise instructions to cause the FWA gateway to:

store a traffic descriptor for the traffic in a classification cache.

20. A method, comprising:

receiving, by a gateway wirelessly connected to a mobile network, traffic for a user equipment device (UE) connected to the gateway;

identifying, by the gateway, a network slice, from a set of network slices potentially supported by the mobile network, for the traffic;

applying, by the gateway, network address translation (NAT) policy rules to select a NAT type from multiple different NAT types to perform for the traffic based on the identified network slice, wherein applying the NAT policy rules to select the NAT type further comprises:

selecting a first NAT type for the traffic if the identified network slice comprises a first network slice; and selecting a second NAT type for the traffic if the identified network slice comprises a second network slice, wherein the first NAT type comprises one of NAT44, Network Prefix Translation version 6 (NPTv6), or NAT66, and wherein the second NAT type comprises one of NAT44, NPTv6, or NAT66;

performing, by the router of the gateway, the selected NAT type for the traffic; and forwarding, by the router of the gateway, the traffic to a modem for transmitting towards the traffic's destination.

* * * * *